Feb. 6, 1968   JO M. TEAGUE, JR   3,367,762
APPARATUS FOR FORMING A FILM OF GLASS
Filed Jan. 4, 1965

INVENTOR.
JO M. TEAGUE, JR.

BY
ATTORNEYS.

United States Patent Office 3,367,762
Patented Feb. 6, 1968

3,367,762
APPARATUS FOR FORMING A FILM OF GLASS
Jo M. Teague, Jr., Toledo, Ohio, assignor to Owens-Illinois Inc., a corporation of Ohio
Filed Jan. 4, 1965, Ser. No. 423,248
3 Claims. (Cl. 65—184)

ABSTRACT OF THE DISCLOSURE

Apparatus for forming a ribbon of glass, comprising a pair of annular forming members mounted for counter rotation in closely spaced vertical planes about spaced parallel axes with arcuate segments of the members overlapping each other to define upper and lower circumferential areas of intersections. Molten glass fed between the upper area of intersection is stretched first generally laterally and then progressively generally longitudinally of the film, by segments of the forming members which move along arcuate paths away from each other after leaving the upper area of intersection. One of the forming members has a hollow portion and receives cut-off means for severing the formed film at a desired width.

---

This invention generally relates to glass forming and more particularly to an improved method and apparatus for producing a film of glass.

In one method of forming glass film disclosed in U.S. Patent to Lane, No. 2,986,844, molten glass is poured between two annular stretching surfaces which counter-rotate about inclined axes. Lane's stretching surfaces overlap in parallel relationship along minor peripheral segments which move downwardly in the general longitudinal direction of the glass. Molten glass initially entering between the overlapping stretching surfaces undergoes relatively slight stretching because the stretching surfaces when overlapping and moving in the same direction of the glass exert practically no lateral force on the molten glass necessary to cause stretching. Subsequently, the once overlapped segments of the stretching surfaces progressively move away from each other in lateral directions relative to the glass to thus stretch the glass into a ribbon.

One main disadvantage of this method is that the glass is stretched at a slow rate initially, that is when the glass is molten, and subsequently as the glass becomes more rigid or viscous, it is stretched at a progressively faster rate. Rapid stretching of the glass as it becomes more viscous adversely affects the stretching process and often causes the glass to be formed with non-uniform properties and characteristics.

Another disadvantage with the method disclosed in Lane patent identified above, is that severing the formed film while it is being stretched at a rapid rate tends to cause buckling and distortion of the glass film.

Accordingly, it is an object of the present invention to provide an improved method and apparatus for making a film of glass which overcomes the above problems to produce high quality glass film having uniform properties and characteristics.

A further object of the present invention is to provide a method and apparatus for forming a film of glass by first subjecting the glass while it is molten to a rapid rate of stretching and then progressively subjecting the glass to a lower rate of stretching as the glass increases in viscosity.

A still further object of the present invention is to provide such apparatus for making a film of glass, which apparatus is comprised of relatively few parts that may be economically manufactured and assembled and will operate efficiently and with virtually no supervision over long periods of continuous use.

Other objects and advantages of the present invention will become apparent from the following description taken in conjunction with the accompanying drawings in which.

Figure 1:
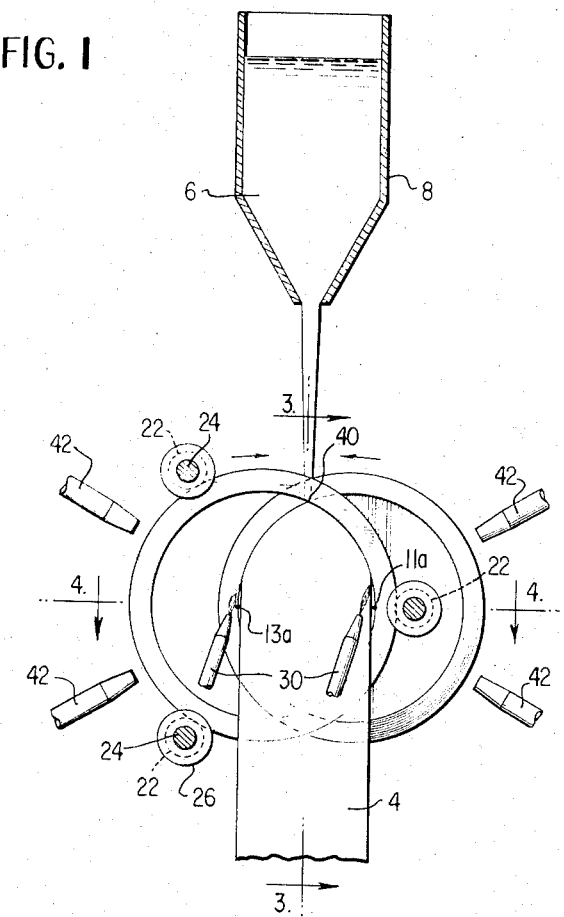
FIG. 1 is a front elevational view with certain portions broken away of apparatus for making glass film in accordance with the present invention.
Figure 4:
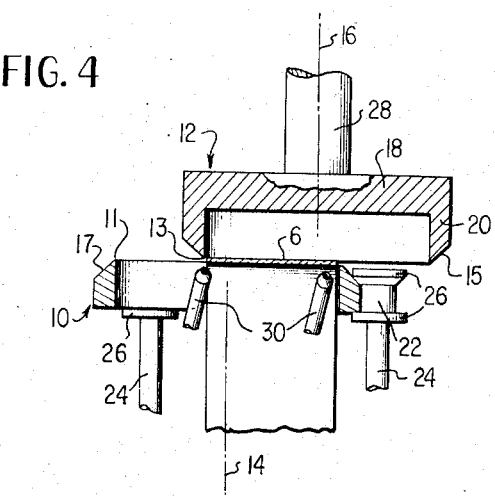
FIG. 4 is a fragmental cross-sectional view taken generally along lines 4—4 of FIG. 1.

Referring to the drawings in detail, FIG. 1 shows for illustrative purposes only, apparatus for forming a film of glass 4 from molten glass 6 stored in a suitable reservoir 8, in accordance with the present invention. The illustrated apparatus includes two annular glass forming or stretching members 10 and 12 mounted in parallel vertical planes for counter-rotation about parallel axes designated 14 and 16 respectively in FIG. 4. In the specific embodiment, forming member 10 is hollow or ring-like while the other member 12 is formed with a solid circular base 18 having an annular flange 20 projecting axially therefrom at right angles.

Forming members 10 and 12 are supported for rotation in close axially spaced relationship with arcuate portions thereof overlapping each other as shown in FIG. 1. As will be described in greater detail, glass film 4 is formed by feeding molten glass 6 between forming members 10 and 12 as the latter counter-rotate. Stretching of the molten glass into the film is effected by annular portions, shown as edges 11 and 13, of forming members 10 and 12 which oppositely engage the molten glass during their period of overlap. To facilitate pouring of the molten glass between forming members 10 and 12, peripheral surfaces 15 and 17 surrounding edges 11 and 13 are beveled to diverge outwardly.

Figure 2:
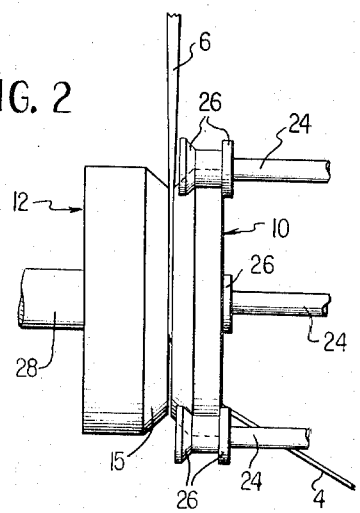
FIG. 2 is a side elevational view of the apparatus of FIG. 1 with certain portions broken away.
Figure 3:
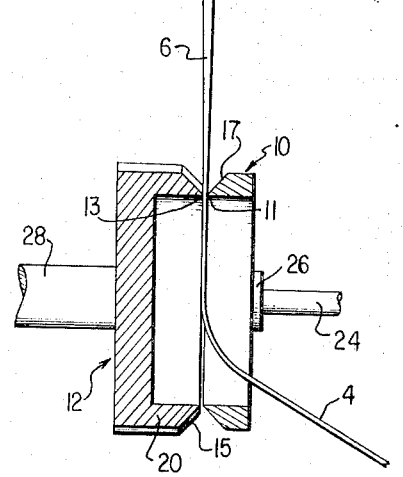
FIG. 3 is a fragmental cross-sectional view taken generally along lines 3—3 of FIG. 1.

The drive and support for forming members 10 and 12 may be provided by any suitable means such as, for example, that employed in the illustrated embodiment including three equally spaced rollers 22 engaging the outer periphery of hollow forming member 10. Rollers 22 are fixed to elongated shafts 24 respectively, which extend axially of hollow forming member 10 and are rotated in the same direction by a suitable motor (not shown). In order to maintain hollow forming member 10 in the proper axial position, support and drive rollers 22 are each provided with end flanges 26 engaging opposite sides of hollow forming member 10 as shown in FIG. 2.

Solid forming member 12 is supported and driven in the shown embodiment by means of a shaft 28 fixed at one end to the center of base 18 and suitably supported at the opposite end to be driven by a motor (not shown) in conventional fashion. Preferably, roller shafts 24 as well as drive shaft 28 are mounted to be adjustable both axially and laterally for adjusting the relative position of forming members 10 and 12 to obtain desired dimensions of the film as will be subsequently described.

In order to produce a film of desired width, cut-off devices such as for example the illustrated jet burners 30, are provided at opposite longitudinal edges of film 4. In the preferred embodiment, cut-off burners 30 extend through hollow forming member 10 from one side thereof and are positioned to sever the opposite edge portions of the film at points spaced inwardly and above forming member edge portions, shown in FIG. 1 as 11a and 13a, which are at their maximum spaced apart relationship for the interval during which they overlap. In this manner, cut-off of the film is effected before the film is stretched to its maximum width obtainable by the specific apparatus.

In operation, assuming that forming members 10 and 12 are rotating in opposite directions, molten glass 6 is poured or forced from reservoir 8 to the area 40 (see FIG. 1) at which the forming members cross. Molten glass entering between forming members 10 and 12 in this manner is engaged by edges 11 and 13 of the forming members and thereby immediately spread and stretched laterally into a ribbon while the glass proceeds downwardly, partly under the influence of gravity.

It will be noted that as peripheral edges 11 and 13 of the forming members initially engage the molten glass, edge portions 11 and 13 move generally laterally with respect to the film. As a result, the molten glass is initially stretched at a relatively rapid rate, it being understood that peripheral edge portions 11 and 13 of the forming members while at their area of crossing 40, impart a relatively high lateral component of force on the molten glass providing the stretching.

As peripheral edge portions 11 and 13 of the forming members leave their area of crossing 40 and move away from each other, they continue to stretch the glass, however, the rate of stretching progressively decreases since the peripheral edge portions 11 and 13 are moving along an arc which moves progressively into the longitudinal direction of the film whereby the lateral component of stretching force on the film is progressively diminished.

Thus it will be seen that in accordance with the present invention, forming members 10 and 12 initially stretch the molten glass at a rapid rate compatible with the molten state of the glass at this point in the process and subsequently, as the glass becomes more viscous, the rate of stretching by forming members 10 and 12 is diminished. In this manner, the glass is smoothly and evenly stretched into a film of uniform strength and dimension. Furthermore, the cut-off of the glass film by jet burners 30 is made while the rate of stretching is relatively low and thus buckling and distortion of the film is substantially avoided.

After the film is cut off by burners 30 into the desired width, the film passes laterally through hollow forming member 10 for subsequent storage in any suitable manner such as by winding on a reel (not shown).

The width of the film is determined by the spacing between the cut-off burners 30 and as mentioned above, it is preferred that the film be cut off before it reaches the maximum width obtainable with the specific forming members and their overlap. In this regard, it will be seen that the maximum film width obtainable depends on the diameter of the forming members as well as the amount of overlap existing therebetween. Moreover as stated above in the preferred embodiment, provision is made for adjusting the overlap of the forming members 10 and 12 in accordance with a desired film width to be obtained.

Additionally, forming members 10 and 12 may be adjusted axially to increase or decrease their parting gap to provide a desired thickness to the film. Thickness of the film is also dependent on the viscosity of the glass, the rate at which the glass is fed between the forming members, the speed of the forming members and the application of external heat to the film while stretching as may be included.

In order to maintain the edge portions 11 and 13 of forming members 10 and 12 clean and in proper condition for stretching, burners 42 or scrapers (not shown) may be provided at spaced peripheral portions of the forming members as shown in FIG. 1.

While the forming members 10 and 12 have been shown as being of the hollow and solidly formed type, it will be apparent that both of the forming members may be formed hollow without departing from the scope of the invention. Likewise, the glass engaging portions of the forming members may be modified to provide greater surface contact than the peripheral edge portions 11 and 13 shown. Moreover, as will be apparent to persons skilled in the art, various other modifications and adaptations of the method and apparatus above-described will become readily apparent without departure from the spirit and scope of the invention which is defined in the appended claims.

What is claimed is:

1. Apparatus for forming a ribbon of glass or like substance comprising in combination: a pair of annular forming members (11, 13) mounted for counter-rotation in closely spaced vertical planes about spaced parallel axes (14, 16) and with arcuate segments of said members overlapping each other to define upper (40) and lower circumferential areas of intersections between said segments, means (8) for feeding molten glass between said segments, means (16, 24) for driving said members in counter directions such that said overlapping segments move away from each other after crossing the upper area of intersection along arcuate paths for stretching the molten glass into a film (4) by first stretching the glass generally laterally of the film and then progressively generally longitudinally of the film, one (10) of said members having a hollow portion, and cut-off means (30) extending in said hollow portion for severing the glass film at a desired width.

2. Apparatus defined in claim 1 wherein said annular forming members have beveled external peripheral surfaces (15, 17) diverging outwardly from each other from the portions of the members which contact the glass.

3. Apparatus defined in claim 1 wherein said cut-off means (30) is located at the inner periphery of said forming members and above the level of the rotational axes (14, 16) thereof.

References Cited
UNITED STATES PATENTS 2,986,843   6/1961   Loukomsky _____ 65—193

DONALL H. SYLVESTER, *Primary Examiner.*

FRANK W. MIGA, *Examiner.*